United States Patent [19]
Scimonelli

[11] 4,325,105
[45] Apr. 13, 1982

[54] HEADLIGHT ASSEMBLY

[76] Inventor: Don R. Scimonelli, 14363 Saguaro Pl., Centreville, Va. 22020

[21] Appl. No.: 69,530

[22] Filed: Aug. 24, 1979

[51] Int. Cl.³ .............................................. B60Q 1/00
[52] U.S. Cl. .................................... 362/80; 362/364; 362/365; 362/440
[58] Field of Search ................ 362/65, 364, 440, 365, 362/80

[56] References Cited
U.S. PATENT DOCUMENTS
3,939,337  2/1976  Oda et al. ............................. 362/365

Primary Examiner—Stephen J. Lechert, Jr.
Attorney, Agent, or Firm—Birch, Stewart, Kolasch & Birch

[57] ABSTRACT

The present invention is directed to a headlight assembly designed for replacing a motor operated flip-up type headlight assembly commonly used in modern automobiles. The headlight assembly according to the present invention is a fixed unit which is readily inserted into the same opening from which the motor drive flip-up type headlight assembly is removed. The fixed unit is esthetically attractive and eliminates the problems in the prior art flip-up headlight assemblies which are commonly subject to corrosion and malfunctioning.

7 Claims, 3 Drawing Figures

HEADLIGHT ASSEMBLY

BACKGROUND OF THE INVENTION

1. Field of the Invention

The present invention is directed to a fixed unit headlight assembly which is readily inserted into an opening in an automobile frame from which a motor operated flip-up type headlight assembly has been previously removed.

2. Description of the Prior Art

Many automobiles produced today are designed to have a streamline appearance. To accomplish this result, many automobile manufacturers conceal the headlight assembly in a flip-up type mechanism. When the headlights are not required, the asembly is concealed within the front frame member of the automobile. In this position, a contoured surface is revealed which gives the front of the automobile a streamlined appearance. When it is necessary to employ the headlights, the operator of the automobile actuates the headlight switch which flips the headlight assembly up from the concealed position to an operative position. However, the motor which operates the flip-up type headlight assembly is subject to corrosion and frequently ceases to operate. If the motor malfunctions when the headlight assembly is in the concealed position, the automobile is not suitable for driving at night unless the headlight assembly is forceably rotated from the concealed position to the operative position. This conventional flip-up type headlight assembly suffers many disadvantages.

It is conventional to position a headlight in a mounting housing. For example, Manex, U.S. Pat. No. 3,354,303, discloses a headlight assembly which is plugged within an opening in the vehicle body 10. In addition, the Goodyer et al patent, U.S. Pat. No. 3,852,586, discloses a housing body 11 designed for retaining a headlight assembly.

In addition to the patents listed above, headlight assembly housings have been developed which extend the normal positioning of a headlight on an automobile frame. For example, the Kinch patent, U.S. Pat. No. 3,406,282, discloses a headlight assembly housing which extends the positioning of the headlight for a Volkswagen.

SUMMARY AND OBJECT OF THE INVENTION

It is a primary object of the present invention to provide a headlight assembly which is readily inserted into an opening in which a conventional flip-up type headlight assembly is mounted.

Another object of the present invention is to eliminate a motor driven flip-up type headlight assembly thus alleviating difficulties encountered by these motors.

A still further object of the present invention is to provide a headlight assembly for an automobile which is esthetically attractive and blends in with the overall streamline appearance of the automobile.

Another object of the present invention is to provide a headlight assembly which is relatively easily mounted within an opening of an automobile in which a conventional flip-up type headlight assembly was previously mounted.

A still further object of the present invention is to provide a headlight assembly which readily permits adjustment of the headlight.

These and other objects of the present invention are accomplished by providing a headlight assembly which is readily inserted into the same opening from which a motor driven flip-up type headlight assembly is removed. The headlight assembly according to the present invention is essentially a unitary structure and includes a recessed entry portion with a bucket member positioned at the innermost end. The bucket member is adapted to receive a light housing and a retaining rim which hold the light within the lighting housing. In addition, the retaining rim is spring biased relative to the lighting housing so as to permit accurate adjustment of the beam of light relative to the highway. The recessed entry portion and the bucket member of the headlight assembly fit within the opening normally occupied by the motor drive and flip-up type headlight assembly conventionally used in certain automobiles. The recessed entry portion and the bucket member include a flange which extends around the entire peripheral surface thereof which mates with the body portion of the automobile. The headlight assembly according to the present invention is readily held in place by two spring clips positioned at the upper end of the bucket assembly adjacent to the flange. In addition, a spring member is disposed adjacent to the lower end of the bucket portion and aids in retaining the headlight assembly within the opening in the automobile frame. The headlight assembly of the present invention overcomes difficiencies in the prior art by completely eliminating the motor driven flip-up type conventional headlight assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
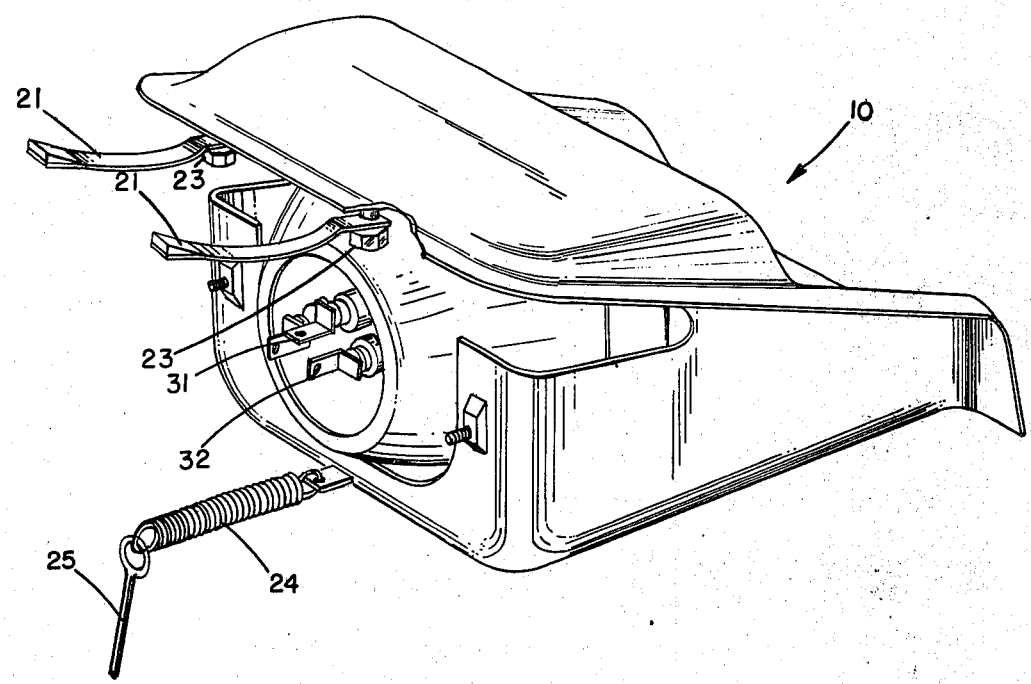
FIG. 1 is a perspective side view illustrating the headlight assembly according to the present invention.

A headlight assembly 10 according to the present invention includes a recessed entry portion 12 and a bucket portion 14. The recessed entry portion 12 and the bucket portion 14 are formed as a unitary structure. In a preferred embodiment of the present invention, these elements can be constructed of fiberglass or a plastic material.

The recessed entry portion 12 and the bucket portion 14 include a flange member 16 which extends around the entire peripheral surface thereof.

The headlight assembly 10 of the present invention is designed to fit within an opening in a car frame 18 in which a conventional flip-up type headlight assembly was previously mounted. The flange portion 16 which extends around the entire peripheral surface of the headlight assembly 10 is designed to mate with an upper surface of the automobile frame 18. In this manner, a very esthetic appearance is given to the headlight assembly 10 after it is inserted within the opening from which the conventional flip-up type headlight assembly was previously removed.

As illustrated in FIG. 1, the headlight assembly 10 includes two spring clips 21 which are connected to the rear portion of the bucket 14 and are mounted on the flange member 16 by means of bolts 23. One spring clip 21 is positioned adjacent to each side of the bucket portion 14. After the headlight assembly 10 is inserted into an opening in the automobile frame, as discussed above, the bolts 23 are tightened to flatten the spring clips 21 from its originally curved positioned. By flattening the spring clips 21, they retain the headlight assembly 10 within the opening in the automobile frame. In addition, a spring 24 is attached to the lower portion of the bucket member 14 and includes a bolt 25 disposed at the other end thereof. The spring 24 in combination with the bolt 25 retain the lower portion of the headlight assembly 10 within the opening in the car frame.

The headlight disposed within the bucket portion 14 of the headlight assembly 10 includes electrical connections 31, 32 disposed at the rear thereof. The electrical connections may be readily attached to the electrical system of the automobile in a conventional manner.

Figure 2:
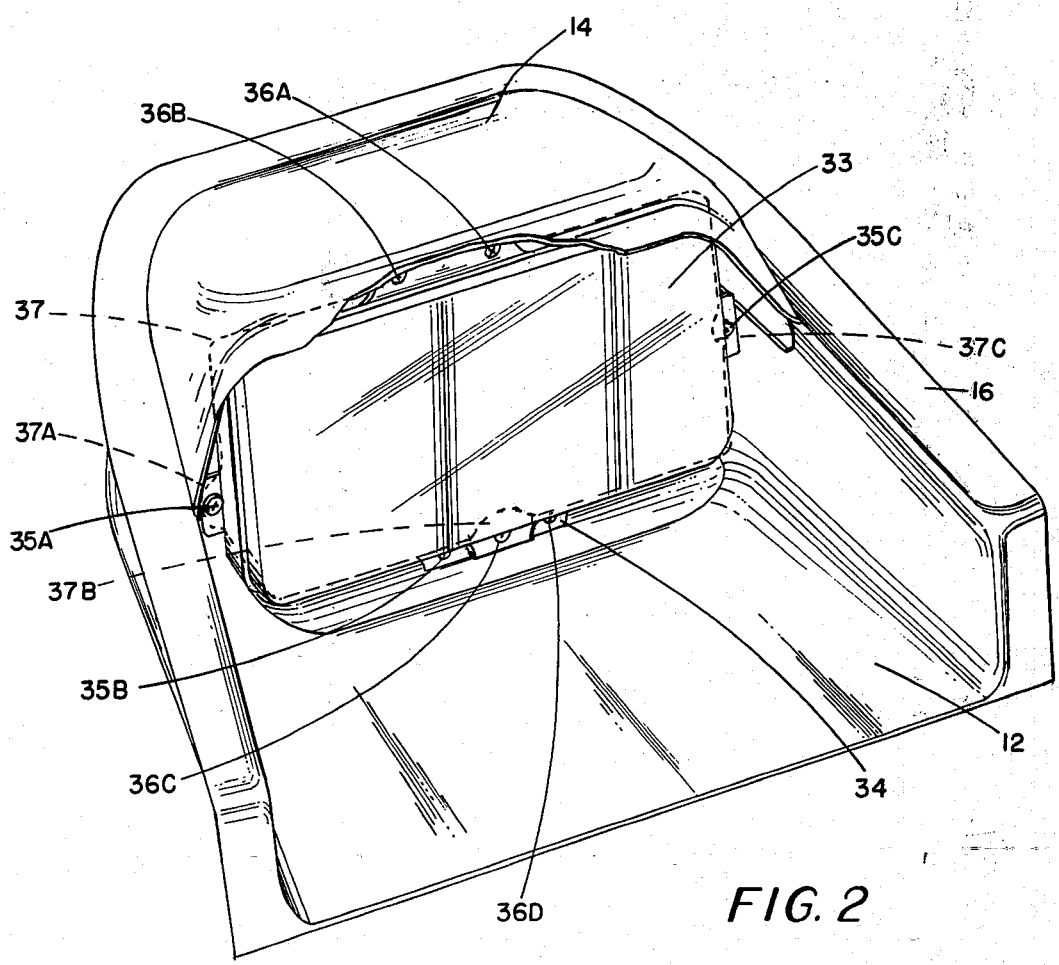
FIG. 2 is a perspective front view illustrating the headlight assembly according to the present invention.

As illustrated in FIG. 2, the headlight 33 is disposed within a headlight housing 34 which is positioned within the bucket portion 14. The headlight housing 34 includes three recesses 35A, 35B and 35C which are designed to receive spring biased retaining screws which permit adjustment of the headlight 33 relative to the headlight housing 34. In this manner, an individual who wishes to adjust the beam of light emitted from the headlight 33 merely has to insert a screw driver through opening 37A-37C in the retaining rim 37, shown in dotted lines for clarity, to gain access to the three spring biased screws. By adjusting the spring biased screws, the headlight 33 may be rotated so as to accurately direct the beam of light.

A retaining rim 37 which is mounted over the exterior peripheral surface of the headlight 33 is affixed to the headlight housing 34 by means of screws which fit in the opening 36A-36D. Therefore, the entire headlight assembly 10 according to the present invention includes a unitary body consisting of the recessed entry portion 12 and the bucket portion 14 together with a headlight housing 34 affixed thereto. The headlight 33 is adjustably disposed within the headlight housing 34 and is retained therein by means of the spring biased screws which fit within the recesses 35A-35C. A retaining rim 37 fits around the peripheral surface of the headlight 33 and is affixed to the headlight housing 34 by means of screws which are inserted into the openings 36A-36D.

The headlight assembly according to the present invention overcomes numerous disadvantages of the conventional flip-up type headlight assemblies. The headlight assembly according to the present invention is a fixed unit which is essentially constructed as a unitary body. In this manner, the headlight assembly does not include any moving parts which may be subject to failure.

Figure 3:
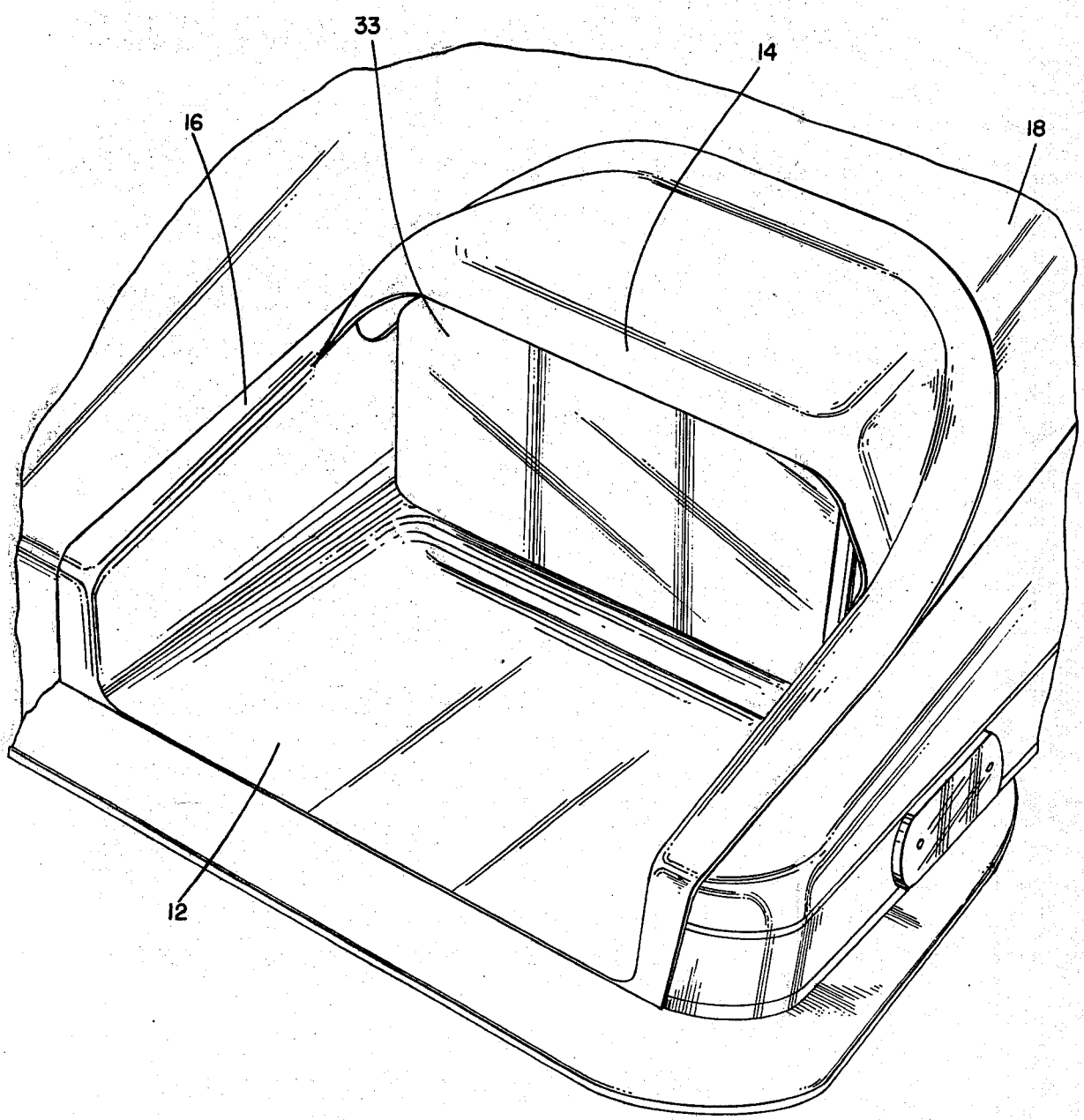
FIG. 3 is a perspective view illustrating the headlight assembly as mounted within an opening in the frame of an automobile.

As illustrated in FIG. 3, the headlight assembly 10 is inserted within the opening of the automobile frame 18. The headlight assembly 10 is esthetic in appearance and adds to the overall appearance of the automobile.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A headlight assembly for replacement of a conventional flip-up type headlight assembly for an automobile comprising:
    a housing including a recessed entry portion and a bucket portion;
    said bucket portion being adapted to adjustably position a headlight; and
    a flange member extending around a peripheral surface of said recessed entry portion and said bucket portion;
    said flange member being shaped to be contiguous with said automobile frame.

2. A headlight assembly according to claim 1, and further including at least one spring clip disposed adjacent to an upper end of said bucket portion for retaining said flange member to said automobile frame.

3. A headlight assembly according to claim 1 or 2, and further including a spring member disposed adjacent to a lower end of said bucket portion for securely retaining said headlight assembly within said opening in said automobile frame.

4. A headlight assembly according to claim 1, wherein a headlight housing is affixed within said bucket portion, said headlight being adjustably disposed within said headlight housing by means of spring adjustment screws, whereby the disposition of said headlight may be adjusted by rotation of said spring adjustment screws.

5. A headlight assembly according to claim 1, wherein said recessed entry portion includes a substantially flat base portion with curved upwardly projecting sidewalls, said sidewalls include an upper end which mate with said flange member.

6. A headlight assembly according to claim 1, wherein said recessed entry portion and said bucket portion are unitary.

7. A headlight assembly according to claim 1, and further including electrical connections positioned at a rear end of said bucket portion being adapted for connection to an electrical system for an automobile.

* * * * *